(12) United States Patent
Robinson

(10) Patent No.: US 9,453,903 B2
(45) Date of Patent: Sep. 27, 2016

(54) SATELLITE ORBITAL DETERMINATION (OD) USING DOPPLER AND KEPLER ORBITAL ELEMENTS

(71) Applicant: Raytheon Company, Waltham, UT (US)

(72) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 752 days.

(21) Appl. No.: 13/904,953

(22) Filed: May 29, 2013

(65) Prior Publication Data
US 2014/0354477 A1   Dec. 4, 2014

(51) Int. Cl.
| | |
|---|---|
| G01S 5/02 | (2010.01) |
| G01S 19/39 | (2010.01) |
| B64G 1/24 | (2006.01) |
| B64G 1/36 | (2006.01) |
| G01S 19/11 | (2010.01) |
| G01S 19/48 | (2010.01) |

(52) U.S. Cl.
CPC ............ *G01S 5/0263* (2013.01); *B64G 1/242* (2013.01); *B64G 1/36* (2013.01); *G01S 19/11* (2013.01); *G01S 19/39* (2013.01); *G01S 19/48* (2013.01)

(58) Field of Classification Search
CPC .......................... G01S 5/0027; H04B 7/1855
USPC ............ 342/357.4, 357.46, 357.78; 701/468, 701/503
See application file for complete search history.

(56) References Cited

U.S. PATENT DOCUMENTS

| | | | |
|---|---|---|---|
| 6,072,428 A | 6/2000 | Schipper et al. | |
| 6,211,822 B1 | 4/2001 | Dougherty et al. | |
| 7,050,002 B1 | 5/2006 | Wright et al. | |
| 8,186,626 B1 | 5/2012 | Liu et al. | |
| 2011/0254734 A1 | 10/2011 | Li et al. | |

OTHER PUBLICATIONS

Chen et al.; Revisiting the Doppler Filter of LEO Satellite GNSS Receivers for Precise Velocity Estimation; Journal of Electronics (China); Apr. 2013; pp. 138-144; vol. 30, No. 2; Springer.
Mur et al.; Satellite Navigation Using GPS; ESA Bulletin 90; May 1, 1997; pp. 55-61; vol. 90; ESA Scientific and Publications Branch, Noordwijk, NL.
PCT Application PCT/US2014/040077; filed May 29, 2014; Raytheon Company; International Search Report mailed Feb. 12, 2015.
Jayles, et al.; "Ten centimeters orbits in real-time on-board of a satellite: Doris-Diode current status"; Acta Astronautica 54 (2004) 315-323.
Vetter; "Fifty Years of Orbit Determination: Development of Modern Astrodynamics Methods"; John Hopkins APL Technical Digest, vol. 27, Nos. 3 (2007).

*Primary Examiner* — Dao Phan

(57) ABSTRACT

Technology to determine a satellite's orbit is disclosed. In an example, an orbital determination (OD) device for a satellite operable to determine a satellite's orbit can include computer circuitry configured to: Receive a single global positioning system-generated (GPS-generated) signal from a GPS satellite; decode an ephemeris of the GPS satellite from the GPS-generated signal; determine a Doppler shift and a Doppler trend of the GPS-generated signal; and generate a Doppler-GPS OD using the ephemeris of the GPS satellite and the Doppler shift and the Doppler trend of the GPS-generated signal fit to Kepler orbital elements of an orbit model.

20 Claims, 10 Drawing Sheets

SATELLITE ORBITAL DETERMINATION (OD) USING DOPPLER AND KEPLER ORBITAL ELEMENTS

BACKGROUND

Each satellite that orbits the Earth can have a distinct ephemeris. The ephemeris can include various information, such as the position or orbit of the satellite on a number of dates and times in a regular sequence. Some satellites can use their orbit information for various applications. For example, a satellite's orbit information can be used for altimeter and imaging system applications. A satellite in a global positioning system (GPS) can use its orbit information to provide location and time information anywhere on or near the Earth, where a GPS receiver has an unobstructed line of sight to the GPS satellite.

Satellite navigation systems, such as the GPS, enable a receiver to determine a location from ranging signals received from a plurality of satellites. The ranging signals can be broadcasted on frequencies, such as the L1 signal (1.57542 gigahertz [GHz]), L2 signal (1.2276 GHz), and/or L5 signal (1.17645 GHz). L1 can have a wavelength of about 19 centimeters (cm) and L2 can have a wavelength of about 24 cm. Position can be determined from code and/or carrier phase information. A code division multiple access (CDMA) code is transmitted by the GPS satellites to the receiver and correlated with replica codes to determine ranges to different satellites, which can be used to determine the position of a GPS receiver on or near the Earth. Generally, a GPS receiver receives signals from multiple GPS satellites (e.g., four) to find its position.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
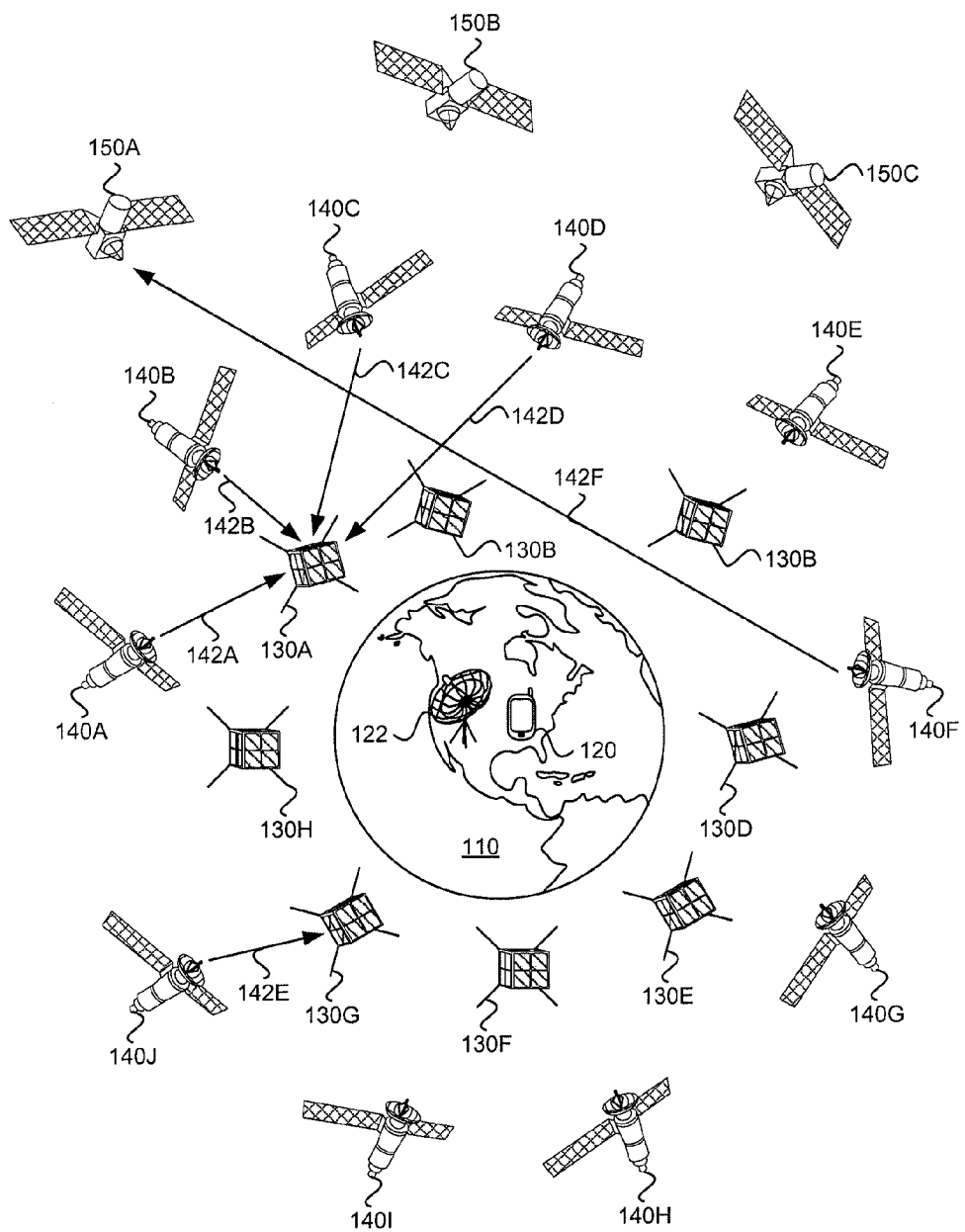
FIG. 1 illustrates a diagram of a plurality of global positioning system (GPS) satellites, a plurality of low Earth orbit (LEO) satellites, and a plurality of geostationary Earth orbit (GEO) satellites or high Earth orbit (HEO) satellites in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The global positioning system (GPS) is a space-based global navigation satellite system (GNSS) that can provide location and time information in various types of weather, anywhere on or near the Earth, where a GPS receiver (e.g., GPS receiver 120 or 122 on the Earth 110 or GPS receiver on a satellite 130A-H or 150A-C) has an unobstructed line of sight to four or more GPS satellites 140A-J, as illustrated in FIG. 1. When a GPS satellite is blocked from the GPS receiver so too few GPS satellites are in view of the GPS receiver, the GPS receiver can provide no positioning information or it can generate inaccurate or incorrect positioning information. Alternatively, the GPS signal on known GPS frequencies may be jammed by an external jamming source or other electronic equipment preventing the GPS receiver from receiving a valid GPS signal. Alternatively, an external spoofing source may generate a false GPS signal on known GPS frequencies in an attempt to spoof the GPS receiver to generate inaccurate or incorrect positioning information. As used herein, GPS receiver can be used interchangeably with GPS transceiver.

FIG. 1 illustrates a constellation of low Earth orbit (LEO) satellites 130A-H, a constellation of GPS satellites 140A-J, and a plurality of geostationary Earth orbit (GEO) or high Earth orbit (HEO) satellites 150A-C. LEO can generally be defined as an orbit within the locus extending from the Earth's surface 110 up to an altitude of approximately 2,000 kilometers (km). A GPS can operate with a constellation of 24 GPS satellites 140A-J. The GPS satellites can be medium Earth orbit (MEO) satellites. MEO can be a region of space around the Earth above the LEO (altitude of approximately 2,000 km or 1,243 miles (mi)) and below geostationary orbit (altitude of 35,786 km or 22,236 mi). The geostationary orbit, also known as the geostationary Earth orbit (GEO), can have a period approximately equal to the Earth's rotational period and an orbital eccentricity of approximately zero. An object in the GEO can appear motionlessly, at a fixed position in the sky, relative to ground observers. In an example, a satellite can also have an altitude that exceeds a GPS satellite in a MEO, a GEO, or a high Earth orbit (HEO). The HEO is a highly eccentric geocentric orbit whose apogee (i.e., the highest or most distant point) lies well above its lowest point. In an example, a MEO satellite can have an orbital altitude of approximately 20000 km with a near 12 hour orbit. A GEO can have a near 24 hour orbit, or an orbit near the rotational rate of the Earth, hence geostationary Earth orbit (GEO). The LEO may be in an orbit between a GPS satellite and a surface of the Earth.

Typically, a GPS satellite's transmission antenna is directed towards the Earth 110. Each GPS satellite can transmit a GPS signal to another satellite, such as a LEO satellite 130A-H or a GEO or HEO satellite by overshooting or grazing the Earth. For example, FIG. 1 illustrates four GPS satellites 140A-D transmitting their GPS signal 142A-D to a LEO satellite 130A. In another example, a GPS satellite 140J can transmit a GPS signal (or GPS-generated signal) 142E to a single LEO satellite 130G, where the LEO satellite can use the GPS-generated signal to determine the LEO satellite's orbit (via Doppler-GPS orbit determination). In another configuration, a GPS satellite 140F can transmit a GPS signal (or GPS-generated signal) 142F to a single GEO or HEO satellite 150A, where the GEO or HEO satellite can use the GPS-generated signal to determine the GEO or HEO satellite's orbit. A GPS signal can be a spread-spectrum, pseudo random noise (PRN) signal that encodes the location of the transmitting satellite. In an example, the GPS-generated signals 142A-F can use the L1, L2, or L5 frequency band. As used herein GPS signal and GPS-generated signals can be used interchangeably to refer to a signal originating from a GPS satellite, and a GPS-like signal refers to a signal originating from a source other than the GPS satellite that encodes the source position versus time and/or the satellite's ephemeris.

Each satellite (e.g., GPS, LEO, MEO, GEO, or HEO satellite) can be referred to as a space vehicle (e.g., sv). The signal from a GPS satellite can be used to generate a measurement to calculate a receiver's position. Each GPS signal can be used solve for one unknown in the three dimensional (3D) position of the receiver (e.g., GPS receiver). Since a 3D position can have three unknowns, three independent signals from three separate GPS satellites can be used to calculate a 3D position. Since the GPS satellite and the GPS receiver do not operate using a same clock, a fourth independent signal from a fourth GPS satellite can be used to compensate for clock bias in the GPS receiver. So, measurements from the independent GPS signals from four different GPS satellites can be used to calculate a precise GPS receiver position. Sometimes more than four satellites may be in view of a GPS receiver, so additional GPS signals can provide redundancy or additional error checking for the measurements used to calculate the GPS receiver position.

A satellite (e.g., LEO, MEO, GEO, or HEO) may use GPS to provide orbit determination. Space legacy orbital determination (OD) can be reliant on GPS and can provide on-board processing of 4 or more channels of GPS signals, where each signal composing a pseudo-range calculation from the receiver to the transmitting satellite.

Low cost, orbital determination (OD) capability for satellites can still be provided, even when GPS may not fully available (e.g., fewer than 4 GPS satellites in view of the GPS receiver), where GPS signals may have regrets (e.g. multipath) or when at least a portion of the GPS constellation is unavailable. In an example, OD can be generated using a GPS-generated signal from a single GPS satellite. OD using a single GPS satellite can be robust with partial GPS capability and may provide operationally responsive space systems to rapidly reconstitute OD capability when fewer than 4 GPS satellites are available. In another example, OD may be determined using a GPS signal (e.g., pseudo-random noise (PRN) code or CMDA code), where a single GPS satellite can provide OD for satellites in HEO and GEO orbits, which can have a low availability to receive GPS transmission 142F from multiple GPS satellites past an Earth horizon.

In an example, orbit determination (e.g. estimating up to the 6 classical Kepler orbital elements) of moving platforms or vehicles can be provided by computing a trend in Doppler of a single GPS signal and decoding the position and/or ephemeris of the GPS transmitter encoded in the GPS signal. The ephemeris can include a table with various information, such as the positions or orbits of a heavenly body (e.g., a satellite) on a number of dates and times in a regular sequence.

OD using a Doppler trend of a GPS signal from a single GPS satellite can be used not only for OD of LEO platforms (e.g., satellites), but can also be used for GEO and HEO platforms. OD using GPS signals from a single GPS satellite can provide a second alternative for OD, computing frequency difference (e.g. performed in analog) of 2 GPS signals (e.g L1 and L2) and decoding the position of the transmitting satellite from one of the signals, which can be looked up in almanac.

OD using a Doppler trend of a GPS-generated signal from a single GPS satellite can be used to compare a legacy pseudo-range OD with the Doppler derived OD to assess spoofing, which can be used to defeat a co-orbital spoofer and/or transponder. OD can be determined using the Doppler trend of a dedicated alternative signal that is transponded via a GEO satellite (GEO SAT) that encodes the position and/or ephemeris of the GEO SAT (similar to a GPS satellite but in GEO). If OD derived from legacy GPS signals or OD derived using Doppler trend of GPS signals indicate spoofing, a satellite receiver can switch to an alternative carrier for OD or as a jamming backup.

Orbit determination (OD) technology (OD device, methods, or computer circuitry) using a GPS signal from a single GPS satellite can apply Doppler trending to fit orbital elements in a way that can significantly simplify the receiver hardware and processing used. OD technology can retain a simplicity of hardware and processing. OD technology can provide an anti-spoofing detection and correction. Orbit determination technology using a GPS-generated signal from a single GPS satellite can be referred to as LEO inertial orbit navigation (LION) when used in LEO satellites. Orbit determination technology used to compare a legacy pseudo-range OD with the Doppler derived OD to assess spoofing can be referred to as a LION enhanced spoofer suppressor (LIONESS) when used in LEO satellites.

Figure 2:
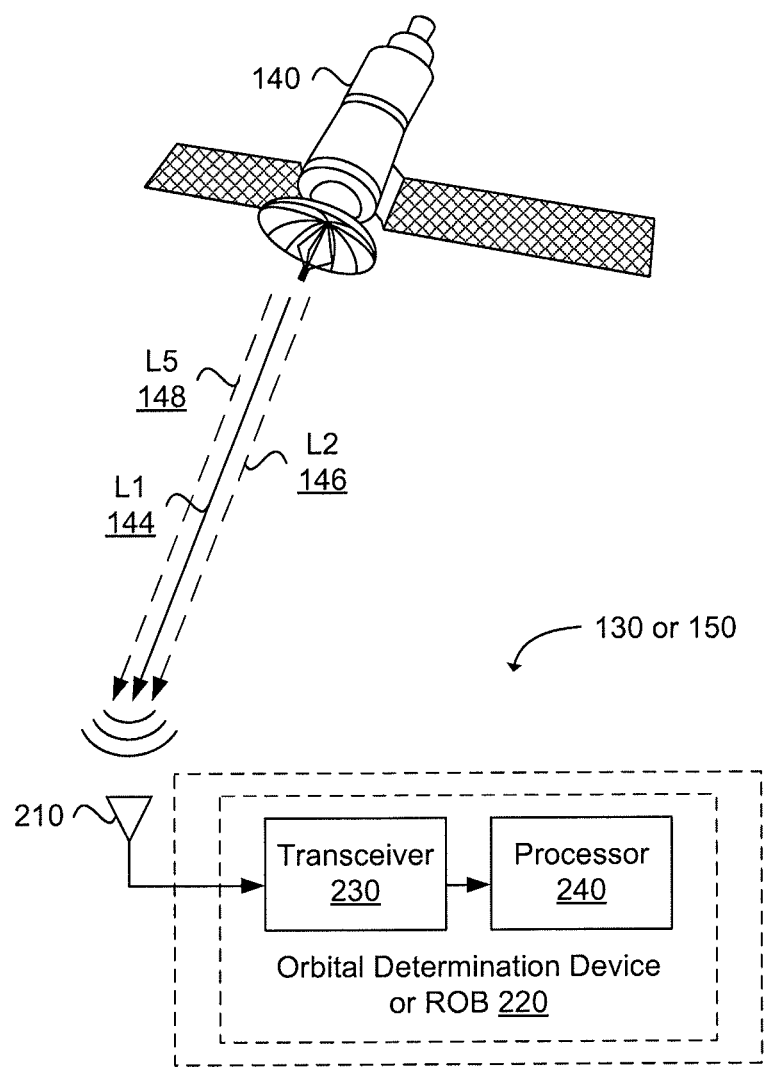
FIG. 2 illustrates a diagram of an orbital determination (OD) device or a receiver-on-board (ROB) for OD of the satellite configured to receive a global positioning system-generated (GPS-generated) signal from a GPS satellite in accordance with an example.

FIG. 2 illustrates an orbital determination (OD) device or a receiver-on-board (ROB) 220 for OD of the satellite 130 or 150 configured to receive a global positioning system-generated (GPS-generated) signal from a GPS satellite 140. The GPS-generated signal can use a L1 (144), L2 (146), or L5 (148) band, or any other GPS band used to transmit a pseudo-random noise code (PRN or PN code) signal available for commercial or military use (e.g., commercial coarse-acquisition (C/A)-type code, a military P(Y)-type code, or an M-type code using a varied GPS signal structure) or other dedicated alternative carrier.

In an example, the GPS satellite 140 transmits the GPS signal (e.g., L1 (144)). For simplicity of illustration, the GPS-generated signal is referred to as L1, but any GPS signal (e.g., L2 (146) or L5 (148)) can be used as long as the frequency is known and the receiver can determine the location of the transmitting satellite. The ROB 220 decodes ephemeris of the GPS satellite and the GPS time (via the transceiver 230 or processor 240). Decoding the ephemeris can include demodulating the L1 signal without legacy processing. In parallel, the ROB can receive each L1 signal and compute a Doppler shift and a Doppler trend. The ROB can combine measurements for OD based on the Doppler shift, the Doppler trend, and the GPS ephemeris. In an example, the satellite's time can use the GPS time. In another example, the ROB can receive a GPS-generated signal from multiple GPS satellites and decode the ephemeris of for each of the GPS satellites from the GPS-generated signal of the specified GPS satellite. In another example, the OD can be refined with L1 signals from multiple GPS satellites. In another configuration, the OD can be refined with GPS pseudorange data. Pseudorange data can include range data generated via legacy GPS processing.

Figure 3:
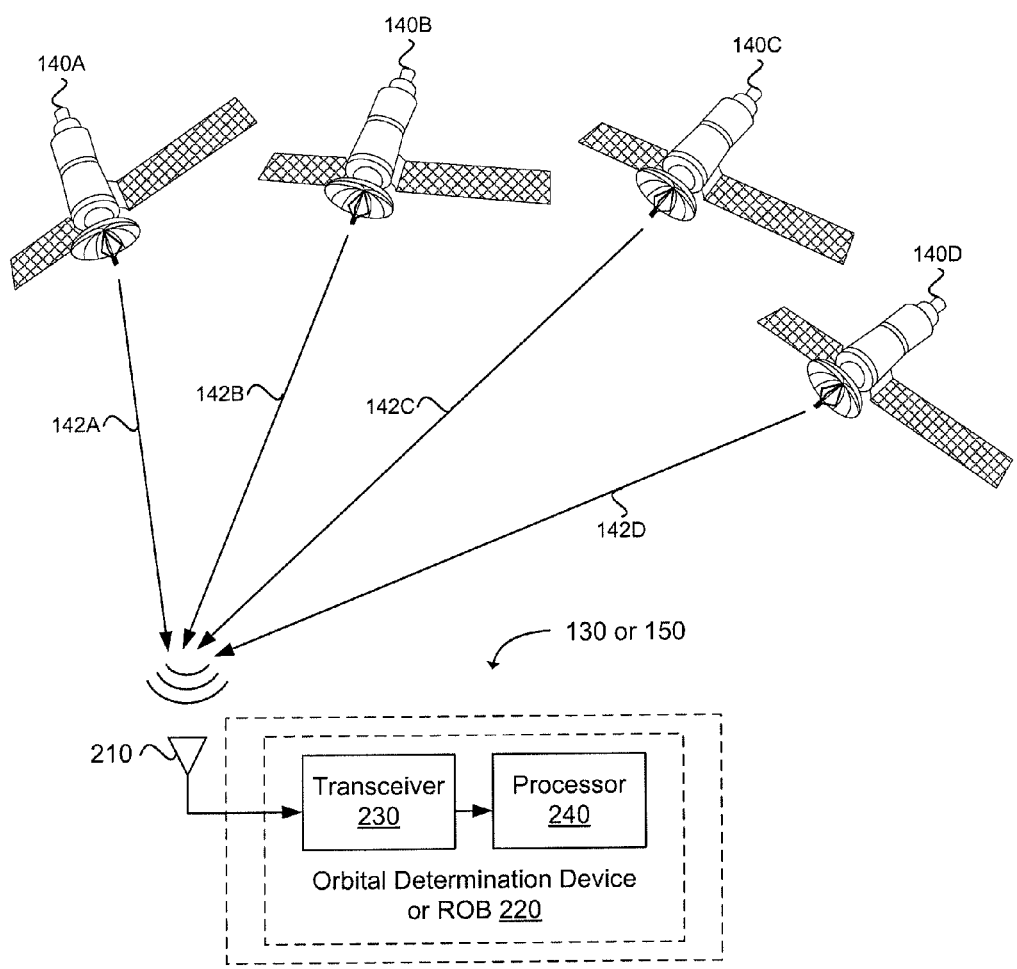
FIG. 3 illustrates a diagram of an orbital determination (OD) device or a receiver-on-board (ROB) for OD of the satellite configured to compare a global positioning system (GPS) OD with a Doppler-GPS OD in accordance with an example.

The OD technology illustrated in FIGS. 2-3 can have the capability to predict an ephemeris using high quality and/or reliable measurements of the satellite's position and/or velocity for relatively low cost. Many U.S. government (USG) and other satellites can rely on GPS. A GPS satellite may not always be available or the satellite may interfere with or obscure some GPS signals. Since GEO or HEO satellites can face away from GPS transmission antennas (since GPS transmits towards Earth), GEO or HEO satellites rarely receive 4 GPS signals (e.g., receives signals that go past the horizon). Satellite receivers (Rx) can receive up to 12 channels using a dual antenna, which can solve spacecraft self-obscuration. The OD technology illustrated in FIGS. 2-3 has the ability perform with as few as one GPS signal thus even if some signals are self-obscured OD can be provided. Similarly, the Doppler shift is insensitive to multipath bounces due to spacecraft structure. The use of as few as one channels can reconstitute a capability, especially for an operationally responsive space system, where a portion of the GPS may be out of commission. In addition, the OD technology illustrated in FIG. 2 can reduce the cost, power, and/or size of on-board system for a small satellite, such as picosatellite (picosat), nanosatellite (nanosat), or CUBESAT, compared to an on-board system that receives and processes 4 or more signals for legacy GPS receiver processing.

Although not to be limiting in any way, in some exemplary embodiments the satellite 130 or 150 illustrated in FIGS. 2-3 can be a CUBESAT or other similar type of small or inexpensive type satellite, such as a picosatellite or a nanosatellite. The CUBESAT can be a type of miniaturized satellite that can have a volume of approximately a liter (10 centimeter (cm) cube) with a weight less than 2 kilograms (kg). The CUBESAT can use commercial off-the-shelf electronics components. The picosatellite (or picosat) can refer to an artificial satellite with a wet mass between 0.1 and 1 kg (0.22 and 2.2 lb). The nanosatellite (or nanosat) can refer to an artificial satellite with a wet mass between 1 and 10 kilograms (kg) (2.2 and 22 pounds (lb)). A microsatellite (or microsat) can refer to an artificial satellite with a wet mass between 10 and 100 kg (22 and 220 lb). These satellites can include various components capable of providing various functions, such a power source or a power generation mechanism, a mechanism to control heating and cooling of the satellite, and/or a mechanism to point a transmitter or antenna to the Earth. The power generation mechanism can include solar cells or panels. The power source can include a battery or capacitive device. The mechanism to control the heating and cooling of the satellite may control the heating and cooling of the satellite passively, so the mechanism does not require a power source to function properly. The mechanism to point the transmitter or antenna to the Earth may steer or rotate the position of the satellite passively. Those skilled in the art will recognize that these several descriptions are merely exemplary, and are not intended to be limiting in any way.

GPS originally evolved for terrestrial users. In GPS position determination, a Doppler shift is not used. After position is determined using PRN signals, Doppler can be used to determine velocity. Using a trend of Doppler shift of carrier having known and/or stable frequency originating from known source (e.g., a single GPS satellite), the position and/or velocity can be fit to orbital elements (e.g., classical Kepler orbital elements). OD can be more readily accomplished for stationary sources (e.g. ground or GEO), but OD can also be generated from a moving object with a knowledge of a source motion (e.g., ephemeris of the GPS satellite). The GPS satellite can provide a stable carrier (e.g., L1, L2, or L5) used to calculate a Doppler shift and/or Doppler trend (but other stable and known carriers may also be used). In an example, the OD technology illustrated in FIGS. 2-3 can be used to correct ionospheric effects for satellites between 80-1000 kilometers (km). Underlying Doppler trend and orbital elements calculations can be used to generate the position and velocity of the satellite using a known stable carrier with a known motion of the source of the stable carrier (e.g., GPS satellite).

GPS satellites can broadcast ultra-stable signals, such as L1 (e.g., 1.57542 GHz) and L2 (e.g., 1.2276 GHz), and can embed ephemeris information in a PRN signal. GPS Block 11F and later satellites can also broadcast L5 (e.g., 1.17645 GHz). A single channel receiver on-board (ROB) with visibility to a single GPS can be used to extract transmitter location and then be used to determine orbit and time. Multiple signals using multiple carriers (e.g., L1, L2, and L5) from a GPS can provide greater accuracy and/or integrity.

To simplify the estimation and/or the ROB 220 in another example, the OD technology illustrated in FIGS. 2-3 can receive two GPS-generated signals on different frequency bands (e.g., L1 and L2) from at least one GPS. For simplicity of illustration, the two GPS-generated signals on different frequency bands are referred to as L1 and L2, but any carrier of opportunity (e.g., L1 (144), L2 (146) or L5 (148)) can be used. The ROB can detect and mix the two signals (e.g., L1 and L2) and compute a difference (e.g., L1-L2) and use the relative Doppler signal to generate an estimation, which can eliminate having a precision reference at GHz frequencies, such as an on-board local oscillator (LO). The OD technology illustrated in FIGS. 2-3 can be extended to additional carriers. Using two signals, common errors in a reference can largely cancel each other out. The ionosphere can have refraction that scales inversely with square of the carrier frequency (i.e., $f^2$). For the satellite in the ionosphere, a small scale factor relative to the altitude can be included in the estimation, ROB, or OD device. The second set of the GPS-generated signals received by the ROB can at least partially compensate for various factors or occurrences, such as atmospheric delays and refraction in the transmitted GPS-generated signals.

Atmospheric delays can include ionospheric delays and tropospheric delays. Ionospheric delay occurs in the ionosphere, which is a part of the upper atmosphere, comprising portions of the mesosphere, thermosphere and exosphere, distinguished because the upper atmosphere can be ionized by solar radiation. The ionosphere can play a part in atmospheric electricity and forms the inner edge of the magnetosphere and can influence radio propagation to distant places on the Earth.

Tropospheric delay occurs in the troposphere, which includes the lowest portion of the Earth's atmosphere. The troposphere contains approximately 80% of the atmosphere's mass and 99% of its water vapor and aerosols. The average depth of the troposphere can be approximately 11 kilometers (km) Troposphere depth can vary, being deeper in the tropical regions, up to 20 km (12 miles), and shallower near the poles, at 7 km (4.3 mi) depending upon the time of year.

Refraction can be the change in direction of a wave due to a change in the index of refraction of the medium through which the signal passes. Although atmospheric refraction may not be measured, the second set of signals can be used to estimate for atmospheric refraction and account for the estimate in final range estimates. Atmospheric refraction can include the deviation of light or other electromagnetic wave, such as a radio frequency (RF) signal, from a straight line as the light or other electromagnetic wave passes through the atmosphere. Refraction can occur due to the variation in air density as a function of altitude. Refraction can cause an extra path to be introduced into flight and can generate a small error in range measurements.

In essence, atmospheric delays and refraction can vary the time of flight (TOF) and the Doppler shift of signals, which variances can be accounted or compensated for by the second set of signals. If the satellite is in the ionosphere then Doppler may be affected.

Using two signals can have benefits over a single signal. Precision orbit determination utilizing on-board processing of Doppler and/or GPS of a single GPS-generated signal with onboard algorithms can utilize a precise oscillator, an ultrastable oscillator, or an atomic clock, which can be more expensive than a satellite with no local oscillator or a standard local oscillator. In addition, orbital determination generated by the satellite often utilizes an on-board local oscillator which can generate errors in measurements. Thus using two GPS-generated signals, orbital determination can be low cost and/or less susceptible to errors in the on-board local oscillator.

In another example, the GPS satellite 140 transmits L1 (144) and L2 (146). The ROB 220 decodes ephemeris of the GPS satellite and the GPS time using L1 or L2 (via the transceiver 230 or processor 240). In parallel, the ROB can receive each L1 and L2 signal and compute a Doppler shift and a Doppler trend. The Doppler shifts can be trended and the two shifts can be compared to each other to compensate and correct for unknown refraction and ionospheric shifts. The ROB can combine corrected measurements for an OD based on the Doppler shift, the Doppler trend, and the GPS ephemeris. In an example, the satellite's time can use the GPS time. In another example, the ROB can receive a GPS-generated signal from multiple GPS satellites and decode the ephemeris of for each of the GPS satellites from the GPS-generated signal of the specified GPS satellite. In another example, the OD can be refined with L1 and L2 signals from multiple GPS satellites. In another configuration, the OD can be refined with GPS pseudorange data.

In another configuration, which can be used with a GEO or HEO satellite receiving a GPS-generated signal with large grazing angle, which may not need to compensate for the ionosphere or refraction, the GPS satellite 140 can transmit L1 (144) and L2 (146). The ROB 220 decodes ephemeris of the GPS satellite and the GPS time using L1 or L2 (via the transceiver 230 or processor 240). In parallel, the ROB can receive each L1 and L2 signal and compute a difference of a Doppler shift and difference of a Doppler trend. The difference of Doppler shifts can be trended to fit to orbital elements. The ROB can combine measurements for an OD based on the difference of the Doppler shift, the difference of the Doppler trend, and the GPS ephemeris. In an example, the satellite's time can use the GPS time. Using differences of the Doppler shift and Doppler trend can provide precise OD without a precision LO in the receiver (e.g., ROB). In another example, the ROB can receive a GPS-generated signal from multiple GPS satellites and decode the ephemeris of each of the GPS satellites from the GPS-generated signal of the specified GPS satellite. In another example, the OD can be refined with L1 and L2 signals from multiple GPS satellites. In another configuration, the OD can be refined with GPS pseudorange data.

In another example, the GPS satellite 140 transmits three GPS-generated signals (e.g., L1 (144), L2 (146), and L5 (148)). For simplicity of illustration, the GPS-generated signals are referred to as L1, L2, and L5, but any carrier of opportunity (e.g., commercial coarse-acquisition (C/A)-type code, a military P(Y)-type code, or an M-type code using a varied GPS signal structure) can be used. The ROB 220 decodes ephemeris of the GPS satellite and the GPS time using L1, L2, or L4 (via the transceiver 230 or processor 240). In parallel, the ROB can receive each L1, L2, and L5 signal and compute a Doppler shift and a Doppler trend. The relative Doppler shifts (a difference of the Doppler shift) can be trended and double differences of Doppler shifts and Doppler trends can be computed and corrected to compensate and correct for unknown refraction and ionospheric shifts. The relative Doppler can be computed for two carriers with no ionospheric correction. The ROB can generate a corrected relative Doppler trend from the double differences of Doppler shifts and the corrected relative Doppler can be trended fit to orbital elements. In an example, the satellite's time can use the GPS time. Using double differences of the Doppler shift and Doppler trend can compensate and correct for unknown refraction and ionospheric shifts and provide precise OD without a precision LO in the receiver (e.g., ROB). Using double differences can use a simpler signal but may take longer to obtain a specified navigational accuracy over using single differences. A single difference can take longer to obtain a specified navigation accuracy over using a Doppler trend. A double difference can be a difference between two single differences.

The OD technology and geo-location described can provide an improvement for real-time and/or time dominant applications. The OD technology described with FIG. 2 can reduce cost of OD systems and can even use as little as a single channel receiver with one antenna without solving GPS pseudo-range equations. The OD technology described can provide GPS backup by using one GPS satellite or fewer than four GPS satellites. In an example, the OD technology described can combine two or more carriers from the GPS satellite or other source and estimate OD based on their frequency difference (e.g., Doppler shift).

FIG. 3 illustrates an orbital determination (OD) device or a receiver-on-board (ROB) 220 for OD of the satellite 130 or 150 configured to compare a legacy pseudo-range OD with the Doppler derived OD to assess spoofing, where the legacy pseudo-range OD and the a Doppler derived OD are both derived from global positioning system-generated (GPS-generated) signals from GPS satellites 140. The GPS-generated signal 142A-D can use a L1, L2, or L5 band, or any other GPS band used to transmit a pseudo-random noise code (PRN or PN code) signal available for commercial of military use (e.g., commercial coarse-acquisition (C/A)-type code, a military P(Y)-type code, or an M-type code using a varied GPS signal structure).

The OD technology can provide detection of GPS spoofing for satellites (e.g., LEO satellites) with backup capability to provide orbital determination (OD). In prior related systems, spoofing can occur when one or more of GPS-like spoof signals are received by the satellite's ROB (receiver on board) in lieu of the regular GPS signals. A spoof detection system may be able to detect spoofing, but may not provide a correction for spoofing or backup OD in cases of spoofing. Often an OD system may be fooled by spoofing and may not even realize spoofing is occurring. The OD technology illustrated in FIG. 3 can provide anti-spoofing detection of a co-orbital spoofer and an alternate OD mechanism when spoofing occurs.

Under many spoofing conditions the OD using Doppler shift information of GPS carriers as generated by the OD technology illustrated in FIG. 2 can provide a different result than legacy GPS OD based on pseudo-range. Thus, to determine an occurrence of spoofing, range-based OD (e.g., legacy GPS OD) can be compared with Doppler-based OD (e.g., Doppler-GPS OD). The range-based OD and the Doppler-based OD can agree to within a small error (or tolerance) when spoofing is not present. If spoofing is detected, the OD technology can test for signs of spoofing from a GPS simulator (e.g., stationary simulator), such as amplitude parity, common timing of all signals, and similar tests. If a GPS simulator is not detected, then co-orbital spoofer may be assumed. The Doppler processing can reveal a position of co-orbital spoofer.

FIG. 3 illustrates an orbital determination (OD) device or a receiver-on-board (ROB) 220 for OD of the satellite 130 or 150 configured to receive global positioning system-generated (GPS-generated) signals 142A-D from multiple GPS satellites 140A-D. The GPS-generated signal can use a L1, L2, or L5 band, or any other GPS band used to transmit a pseudo-random noise code (PRN or PN code) signal available for commercial of military use (e.g., commercial coarse-acquisition (C/A)-type code, a military P(Y)-type code, or an M-type code using a varied GPS signal structure) or other carrier of opportunity.

In an example, each GPS satellite 140A-D transmits the GPS-generated signal 142A-D (e.g., L1). For simplicity of illustration, the GPS-generated signal is referred to as L1, but any carrier of opportunity (e.g., L2 or L5) can be used. Four or more GPS satellites can transmit a signal on L1. The ROB 220 decodes ephemeris of the GPS satellite and the GPS time for each GPS satellite (via the transceiver 230 or processor 240). The ROB can compute OD (e.g., GPS OD) with GPS pseudo-range data. In parallel, the ROB can receive each L1 signal and compute a Doppler shift and a Doppler trend of at least one L1 signal. The ROB can combine measurements for OD (Doppler-GPS OD) based on the Doppler shift, the Doppler trend, and the GPS ephemeris. In an example, the satellite's time can use the GPS time. The ROB can compare the GPS OD with Doppler-GPS to determine if spoofing is occurring. If spoofing is occurring, the ROB can check for simulated signals and report a result. If spoofing is not occurring from simulated signals, then the ROB can estimate a position of a spoofer using the Doppler-GPS OD and report a result.

In another example, a RF receiver can receive an additional "carrier" and Doppler processing can be applied to the additional "carrier" The carrier can be from a source of known location. The additional "carrier" can be a dedicated signal, similar to a GPS-like PRN signal from a GEO or HEO satellite. If spoofing is detected, the ROB can switch to the signal on the additional "carrier" or "carrier of opportunity" for OD. In another example, more than one frequency or "carrier of opportunity" may be used to make spoofing or jamming difficult.

When using an alternate carrier, various carriers may be broadcast to the satellite (e.g., LEO satellite). The carriers can enable the satellite to use a dipole or patch antenna with little directivity. The source can have a stronger signal than normally transmitted (e.g., average source). For example, a PRN signal can be relayed through a GEO satellite. The signal can use a format similar to a GPS format and encode a position of a source and a relay (e.g., GEO satellite). For instance, a tracking and data relay satellite (TDRS) can have a powerful S-band that can close with a low directivity antenna. A number of satellites can broadcast at 3 GHz or below that can close.

Referring back to FIG. 3, the OD technology (e.g., ROB 220) can include a voting mechanism to compare OD from multiple GPS signals with each other. Four or more GPS satellites can transmit a signal on L1. The ROB 220 decodes ephemeris of the GPS satellite and the GPS time for each GPS satellite (via the transceiver 230 or processor 240). The ROB can compute OD (e.g., GPS OD) with GPS pseudo-range data. In parallel, the ROB can receive each L1 signal and compute a Doppler shift and a Doppler trend. The ROB can combine measurements for OD (Doppler-GPS OD) based on the Doppler shift, the Doppler trend, and the GPS ephemeris. In an example, the satellite's time can use the GPS time. The ROB can compare each Doppler based OD to the other Doppler OD. Voting can be implemented to assess if one or more signals are in error. In an example, the GPS-generated signal can be extended to GPS L2 and L5 carriers. The ROB can compare the GPS OD with a selected Doppler-GPS (or composite Doppler-GPS generate via voting) to determine if spoofing is occurring. If spoofing is occurring, the ROB can check for simulated signals and report a result. If spoofing is not occurring from simulated signals, then the ROB can estimate a position of a spoofer using the Doppler-GPS OD and report a result.

The OD technology illustrated in FIG. 3 provides detection of GPS spoofing by comparing Doppler derived OD and pseudo-range derived OD. The OD technology can test each GPS Doppler as a stand-alone input for OD and provide correction of GPS spoofing. In another example, protection of spoofing using Doppler processing of alternate carrier (e.g., signal from relay such as tracking and data relay satellite system (TDRSS) or other communication carrier of opportunity) can be used. TDRSS is a network of American communications satellites (each satellite is called a TDRS) and ground stations used by National Aeronautics and Space Administration (NASA) for space communications.

The OD technology has been demonstrated for determination of orbital parameters using a single Doppler signal (e.g., from GPS or GEO satellite). The OD technology provides a method to use the trend in Doppler signal received from as few as one GPS satellite or other satellite (e.g. GEO satellite) transmitters whose ephemeris is known (or encoded in the signal) to determine the orbit of a satellite (e.g. a LEO satellite).

A deterministic relationship can exist between the orbital elements of a known satellite (e.g., GPS satellite) and a satellite whose orbit is not known (e.g., LEO satellite) using classic Kepler orbital elements.

Figure 4:
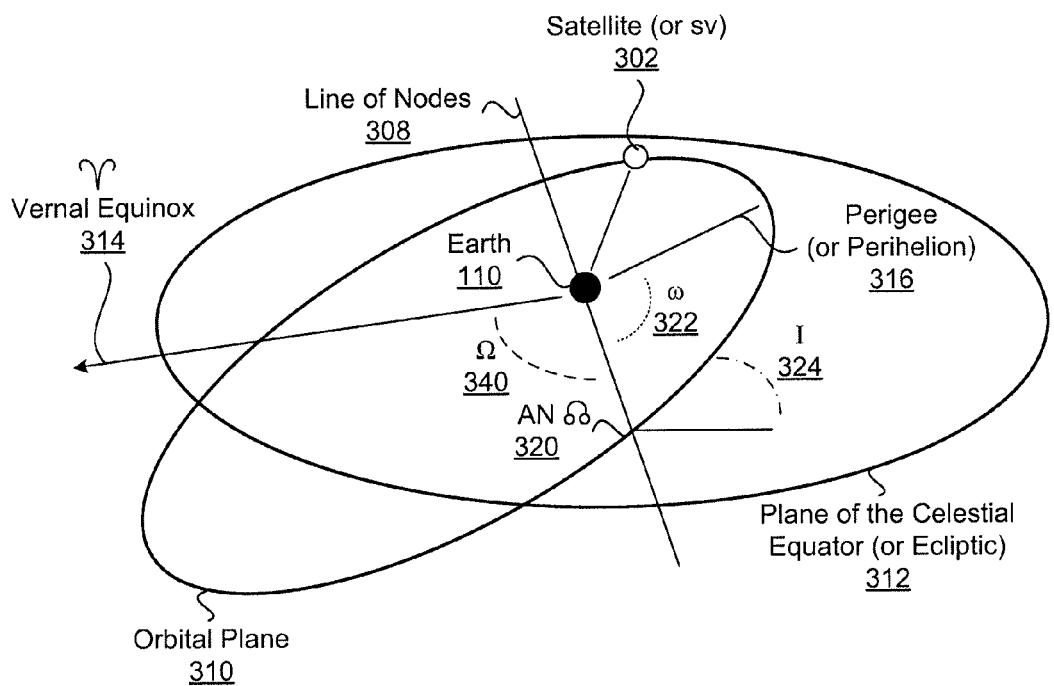
FIG. 4 illustrates a diagram of Kepler orbital elements in accordance with an example.
Figure 5B:
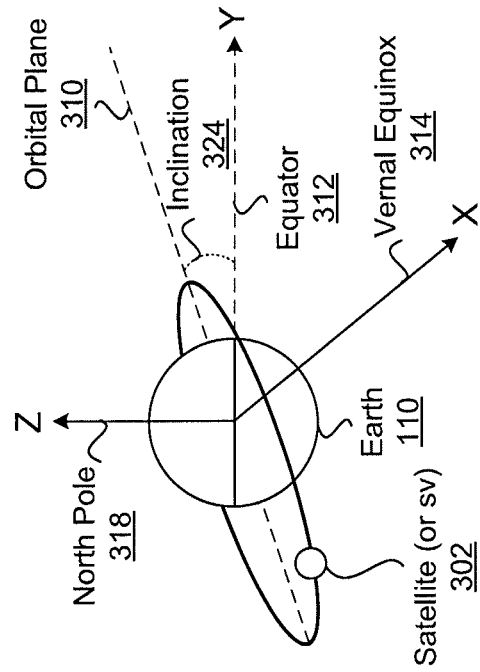
FIGS. 5A and 5B illustrate diagrams of Kepler orbital elements in accordance with an example.
Figure 5A:
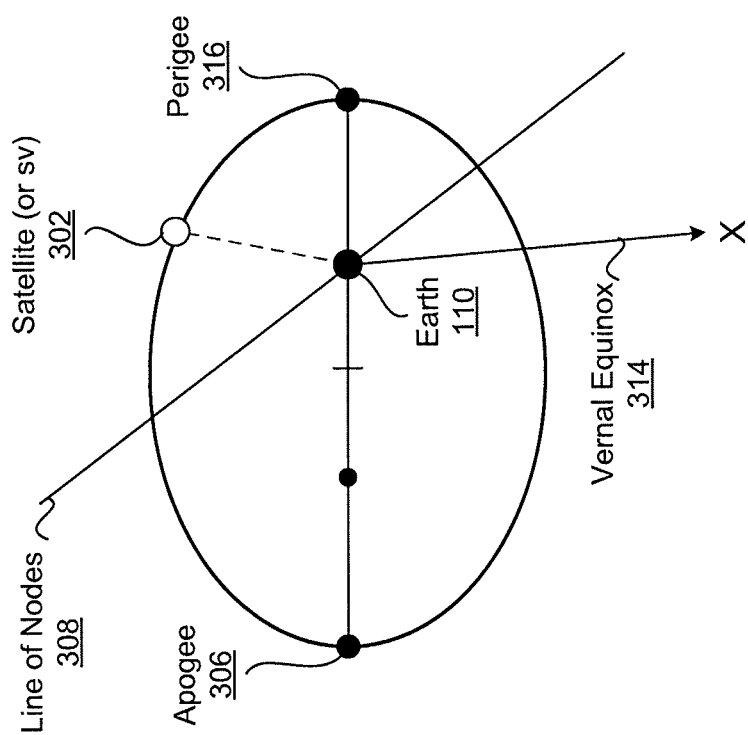
Figure 6:
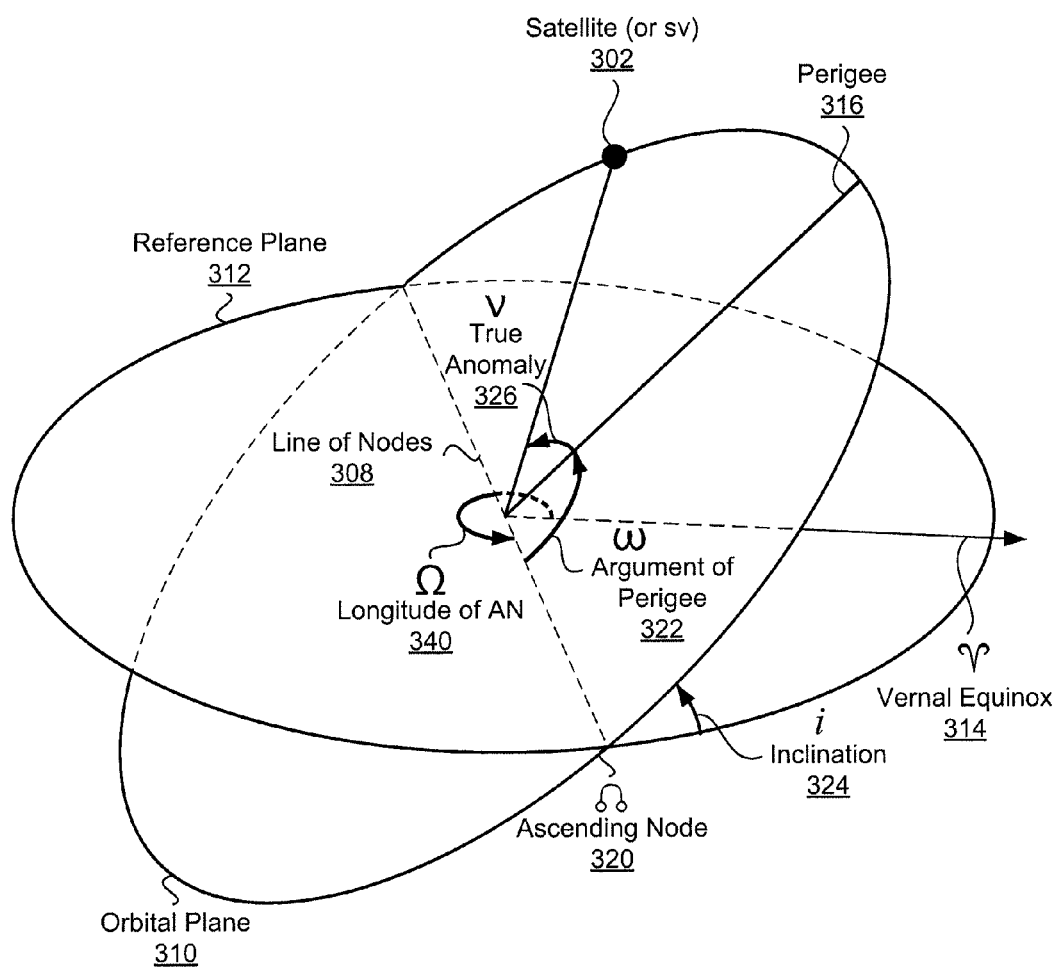
FIG. 6 illustrates a diagram of Kepler orbital elements in accordance with an example.

Orbital elements can be the parameters required to uniquely identify a specific orbit. FIGS. 4-6 illustrate diagrams of Kepler orbital elements. In orbital mechanics or astronomy, orbital elements can be considered in classical two-body systems, where a Kepler orbit is used. The Kepler orbit can be derived from Newton's laws of motion and Newton's law of universal gravitation. Various mathematically representations can be used to describe a same orbit, but the various representations can each consist of a set of six commonly used parameters. In a real orbit, a satellite (and its elements) can change over time due to gravitational perturbations by other objects and the effects of relativity. A Keplerian orbit can be an idealized, mathematical approximation at a particular time.

The classical orbital elements can include six Keplerian elements based on Kepler's laws of planetary motion. When viewed from an inertial frame, two orbiting bodies (e.g., the Earth 110 and a satellite 302) can trace out distinct trajectories. Each of these trajectories can have a focus at the common center of mass. When viewed from the non-inertial frame of one body (e.g., Earth), the trajectory of one of the bodies (e.g., satellite) can be apparent. Keplerian elements can describe non-inertial trajectories. An orbit can have two sets of Keplerian elements depending on which body is used as a point of reference. The reference body can be called the primary, the other body can be called the secondary.

An ellipse can be used to represent an orbit. Two elements that can define a shape and size of an ellipse can be an eccentricity (e) and a semimajor axis (a). The eccentricity (e) can characterize a shape of the ellipse, such as describing elongation compared to a circle. The semimajor axis (a) can be the sum of the periapsis (i.e., perigee or perihelion) 316 and apoapsis (i.e., apogee) 306 distances divided by two. For circular orbits the semimajor axis is the distance between the center of the bodies, not the distance of the bodies to the center of mass. The ellipse representing the orbit can be on an orbital plane 310.

Two elements that can define the orientation of the orbital plane 310 of the ellipse can be an inclination (e.g. the equatorial plane) (I or i) 324 or a longitude of the ascending node (Ω) 340. The inclination (I or i) represents the vertical tilt of the ellipse with respect to the reference plane, which can be measured at the ascending node 320 (where the orbit passes upward through a reference plane 312 or plane of the celestial equator (or ecliptic) when the Earth is used for the point of reference). Longitude of the ascending node (Ω) can horizontally orient the ascending node of the ellipse (where the orbit passes upward through the reference plane) with respect to a reference point or the reference frame's vernal point, referred to as a vernal equinox 314. The intersection between the reference plane 312 and the orbital plane 310 can be referred to as the line of nodes 308, which can connects the center of mass with the ascending and descending nodes.

The position of the satellite on the ellipse can be represented by an argument of periapsis (ω) and a mean anomaly at epoch ($M_0$). The argument of periapsis (ω) defines the orientation of the ellipse in the orbital plane, as an angle measured from the ascending node 320 to the periapsis 316 (i.e., a closest point the second body (e.g., Earth) comes to the first body (e.g., satellite) during an orbit). The mean anomaly at epoch ($M_0$) defines the position of the orbiting body (e.g., satellite) along the ellipse at a specific time (the "epoch"). The mean anomaly can be a mathematically convenient "angle" which varies linearly with time, but which does not correspond to a real geometric angle. The mean anomaly can be converted into the true anomaly (v) 326, which represents a real geometric angle in the plane of the ellipse, between periapsis (i.e., closest approach to the central body) and the position of the orbiting object at any given time.

The angles of inclination, longitude of the ascending node, and argument of periapsis can also be described as the Euler angles defining the orientation of the orbit relative to the reference coordinate system. Non-elliptic patrajectories can exist but are not closed and thus are not considered orbits. If the eccentricity is greater than one, the trajectory is a hyperbola. If the eccentricity is equal to one and the angular momentum is zero, the trajectory is radial. If the eccentricity is one with an angular momentum, the trajectory is a parabola.

In another example, the ascending node (AN) 320 is the point in a satellite's orbit where the satellite crosses the plane of the celestial equator (or ecliptic for a sun orbiting object) 312 going north (e.g., towards the north pole 318). The argument of perigee (ω) 322 is the angle between the ascending node and perigee (or perihelion for sun orbiting satellites), measured counter clockwise along the plane of the orbit. The eccentricity (e) can be half of the distance between the foci of an ellipse divided by the semi-major axis. The inclination (I) 324 can be the angle between the plane of the orbit 310 and the plane of the celestial equator 312. The mean anomaly can be the angle that a satellite would have moved since last passing the perigee assuming that the satellite moved at a constant speed in an orbit on a circle of the same area as the actual orbital ellipse. The mean anomaly can be equal to the true anomaly at perigee 316 and apogee 306 for elliptical orbits, or at all times for circular orbits. The semi-major axis (a) can be half the distance between the periapsis and the apoapsis.

In another configuration, the semi-major axis (a) can be a constant defining the size of the orbit. The eccentricity (e) can be a constant defining the shape of the orbit, where e=0 represents a circular orbit and e<0 represents an elliptical orbit. The inclination (i) represents the angle between the equator 312 and the orbit plane 310. The right ascension of the ascending node (Ω) 340 can be the angle between vernal equinox 314 and the point (e.g., ascending node 320) where the orbit crosses the equatorial plane. The argument of Perigee (ω) 322 can be the angle between the ascending node and the orbit's point of closest approach to the earth (perigee 316). The true anomaly (v) can be the angle between perigee and the vehicle 302 (in the orbit plane 310).

Earth Centered Inertial (ECI) coordinates can be converted to spherical coordinates for the satellite. For example, the mean motion, n, can be represented by $$n = \sqrt{\frac{\mu}{a^3}},$$

where μ=3.986005e14. The mean anomaly, M, can be represented by M=n(t−T). The eccentric anomaly, E, can be represented by $$E = M + e\sin M + \frac{1}{2}e^2\sin 2M + \frac{1}{8}e^3(3\sin 3M - \sin M) + \ldots$$

The true anomaly, v, can be represented by $$\tan\frac{v}{2} = \left[\frac{(1+e)}{(1-e)}\right]^{1/2}\tan\frac{E}{2} \text{ or } v = \arctan\left(\frac{\sqrt{1-e^2}\times\sin E}{\cos E - e}\right).$$

The distance from the center of the Earth, r, can be represented by $$r = \frac{a(1-e^2)}{(1+e\cos(v))}.$$

The position vector can be represented by $$\begin{bmatrix}X\\Y\\Z\end{bmatrix} = r\begin{bmatrix}\cos(\omega+v)\cos(\Omega) - \sin(\omega+v)\sin(\Omega)\cos(i)\\\cos(\omega+v)\sin(\Omega) + \sin(\omega+v)\sin(\Omega)\cos(i)\\\sin(\omega+v)\sin(i)\end{bmatrix}.$$

Using the classic Kepler orbital elements illustrate in FIGS. 4-6 and the analytic derivation of satellite position in an ECI) coordinates, shown above, a time derivative of position, representing velocity, can be generated. A useful representation converting orbital elements to satellite velocity (in ECI coordinates) follows.

In an example, a velocity vector can be represented by $$\begin{bmatrix}\frac{dx}{dt}\\\frac{dy}{dt}\\\frac{dz}{dt}\end{bmatrix} = \begin{bmatrix}V_X\\V_Y\\V_Z\end{bmatrix} = \frac{na}{r}\begin{bmatrix}bl_2\cos E - al_1\sin E\\bm_2\cos E - am_1\sin E\\bn_2\cos E - am_1\sin E\end{bmatrix},$$

when r and E are constant (e.g., a circle), where $b=a(1-e^2)^{1/2}$; $l_1=\cos\Omega\cos\omega-\sin\Omega\sin\omega\cos i$;
$m_1=\sin\Omega\cos\omega-\cos\Omega\sin\omega\cos i$; $n_1=\sin\Omega\sin i$;
$l_2=-\cos\Omega\sin\omega-\sin\Omega\cos\omega\cos i$; $m_2=-\sin\Omega\sin\omega\cos\Omega\cos\omega\cos i$; and
$n_2=\cos\omega\sin i$. The Doppler frequency $f_d$ can be represented by $$f_d = \frac{f_0 v_t}{c}$$

where $f_0$ is a carrier frequency (e.g., L1, L2, or L5) and $$v_t = \frac{d(P_s - P_e)}{dt}$$

in spherical coordinates and where $P_s$ is the position of the satellite, $P_e$ is the position of the Earth, and c represents a speed of light constant (e.g., 299,792,458 meter per second).

Figure 10:
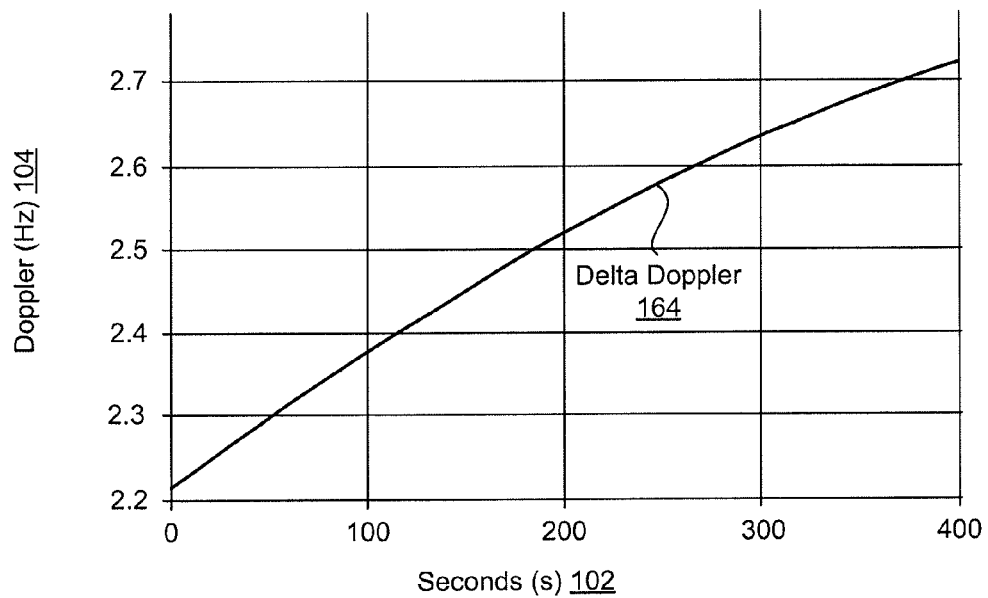
FIG. 10 illustrates a diagram of a difference in a Doppler trend between a low Earth orbit (LEO) satellite orbit and an estimated LEO satellite orbit for a 500 meter error in altitude and an approximately 350 meter (m) anomaly along a track in accordance with an example.
Figure 11:
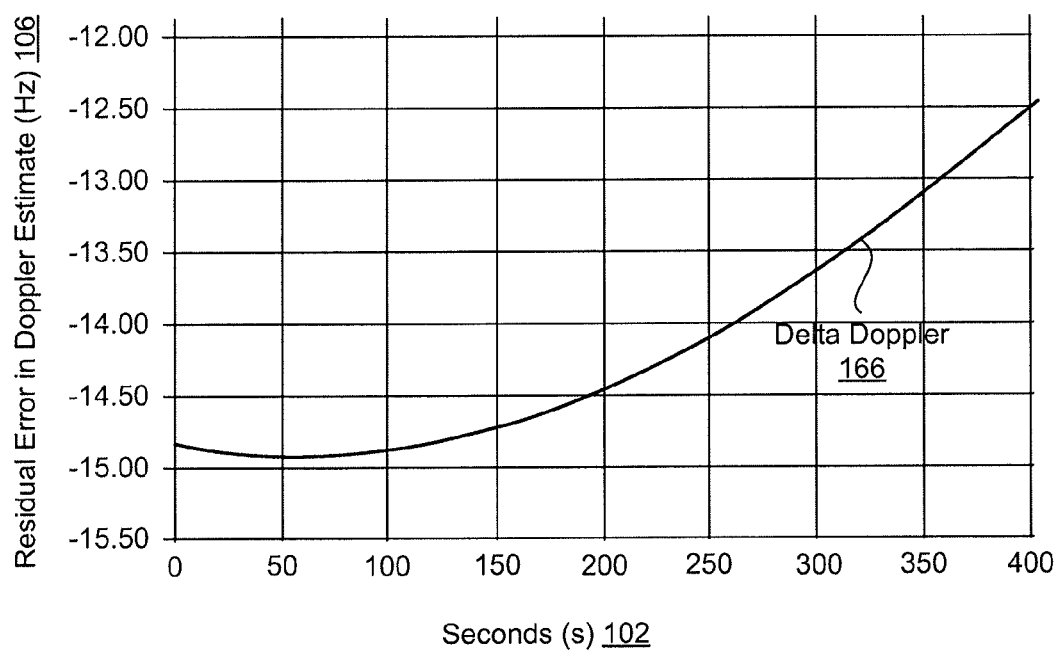
FIG. 11 illustrates a diagram of a difference in a Doppler trend between a low Earth orbit (LEO) satellite orbit and an estimated LEO satellite orbit for a 0.1 degree inclination error in accordance with an example.

The Doppler shift can be the carrier frequency divided by c times the magnitude of the velocity difference vector of two satellites, when each satellites velocity is expressed in ECI. The velocity versus time can be calculated for a GPS satellite. In an example, the following assumptions can be used: the semi-major axis is 26,560,300 meters (m), the inclination is 55 degrees, eccentricity is 0.001393, the mean anomaly is −2.62555 radians (rad), and the argument of perigee 2.56865 rad. A Doppler trend over time for a LEO satellite at inclination 45 degrees at an approximately 700 km altitude is illustrated in FIGS. 9-11.

In an example, a ROB can make an initial determination, estimate, or guess of an orbit, which can be one or several determinations, estimates, or guesses. The ROB can compute expected Doppler trend(s). The ROB can measure a Doppler trend of a test case and compute a residual. The ROB can determine a sign, an inflection(s), an average, a slope, a second derivative of residual(s), and/or a third derivative of residual(s). Multiple methods, such as random trial and error, can be used to iterate to a solution. Priority testing can also be used to provide an adaptive approach to iterate more quickly to a result. A shape of a measurement or shape of an error can be used to determine an orbital element to adjust. For example, a flat error can indicate an error in semi-major axis, which can be a least sensitive parameter. An error in mean anomaly can produce a slope. An error in inclination, which can be sensitive parameter (e.g., parameter with frequent variation), can produce a much stronger second derivative and an inflection point. An eccentricity error can produce more third derivative.

A Kalman filter can efficiently estimate values of the unknown orbital elements. The Kalman filter can produce estimates of the true values of measurements and their associated calculated values by predicting a value, estimating the uncertainty of the predicted value, and computing a weighted average of the predicted value and the measured value. The most weight can be given to the value with the least uncertainty. The estimates produced by the Kalman filter tend to be closer to the true values than the original measurements because the weighted average has a better estimated uncertainty than either of the values that went into the weighted average. Other modules and methods may also be used in estimating orbits.

Figure 9:
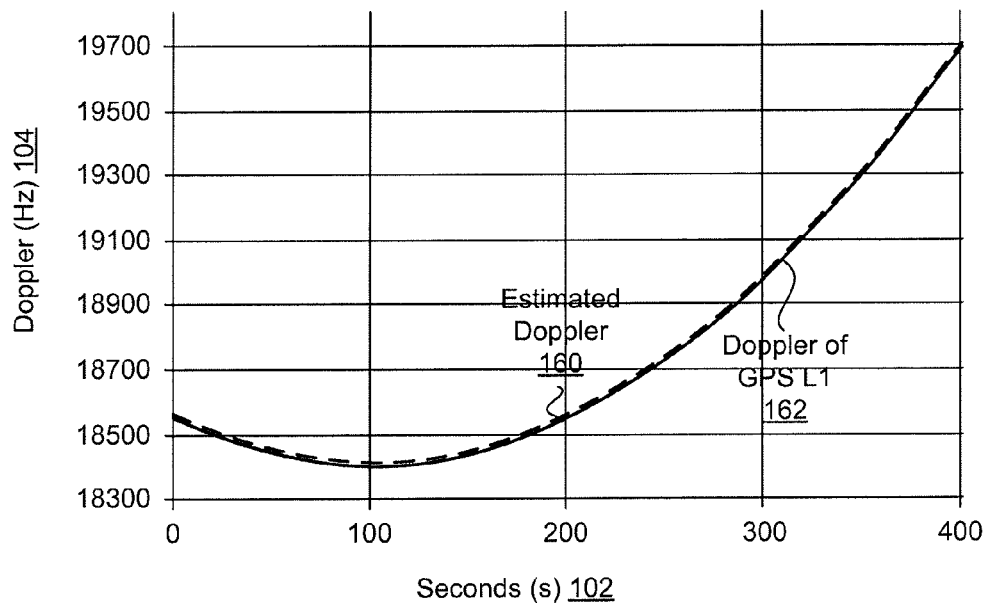
FIG. 9 illustrates a diagram of a Doppler shift of global positioning system (GPS) L1 signal for a low Earth orbit (LEO) satellite orbit and an estimated LEO satellite orbit in accordance with an example.

FIG. 9 illustrates a diagram of a Doppler shift of global positioning system (GPS) L1 signal 162 for a low Earth orbit (LEO) satellite orbit and an estimated Doppler 160 for the LEO satellite orbit measured in Hz 104 over time in seconds 102. A 2500 meter error is shown so both the Doppler of the GPS L1 and the estimated Doppler can be seen. The eccentricity is small, so eccentricity can be rounded to zero.

FIG. 10 illustrates a diagram of a difference (i.e., delta Doppler 164) in a Doppler trend between a low Earth orbit (LEO) satellite orbit and an estimated LEO satellite orbit for a 500 meter error in altitude and an approximately 350 meter (m) anomaly along a track.

FIG. 11 illustrates a diagram of a difference (i.e., delta Doppler 166) in a Doppler trend between a low Earth orbit (LEO) satellite orbit and an estimated LEO satellite orbit for a 0.1 degree inclination error measured as residual error in Doppler estimate (Hz) 106 over time in seconds 102.

Based on the demonstration, a deterministic relationship can exist between satellite orbital elements and Doppler trend. Doppler levels and residuals can be of order that can be estimated in a reasonable time (e.g., real-time). Doppler levels and residuals can be comparable to measurements for estimating a LEO satellite from a ground location on the Earth. Depending on a quality of an initial determination or guess on an orbit (e.g., cold start), an accurate initial OD can take from hundreds of second to thousands of seconds to generate. Once an orbit is estimated, the errors can be comparable to ground-based GPS receiver performance (e.g., within meters from Doppler-GPS OD).

A Doppler shift can be a change in a frequency of a wave for an observer, such as a receiver, moving relative to the source of the wave, such as a transmitter on a satellite. The motion of the observer, the source, or both can generate a change of the frequency. The relative changes in frequency due to the Doppler effect can be explained as follows. When the source of the waves is moving toward the observer, each successive wave crest is emitted from a position closer to the observer than the previous wave. Therefore, each wave takes slightly less time to reach the observer than the previous wave. Thus, the time between the arrival of successive wave crests at the observer is reduced, causing an increase in the perceived frequency. Conversely, if the source of waves is moving away from the observer, each wave is emitted from a position farther from the observer than the previous wave, so the arrival time between successive waves is increased, reducing the perceived frequency.

Objects moving at greater velocities relative to each other can provide more accuracy in Doppler measurements than objects moving at slower velocities relative to each other. Objects at closer distances to each other can provide more accuracy in Doppler measurements than objects at farther distances to each other. The satellite operating in LEO or GEO can impose a greater amount of Doppler shift on the GPS-generated signal than a satellite operating in MEO, which can have a slower apparent velocity.

Each signal received by the satellite and transmitted by the GPS satellite can experience a Doppler shift in frequency due to the relative motion between the GPS satellite and the satellite transceiver. Thus, each signal, such as the GPS-generated signal can experience a different Doppler shift from each other.

Figure 7:
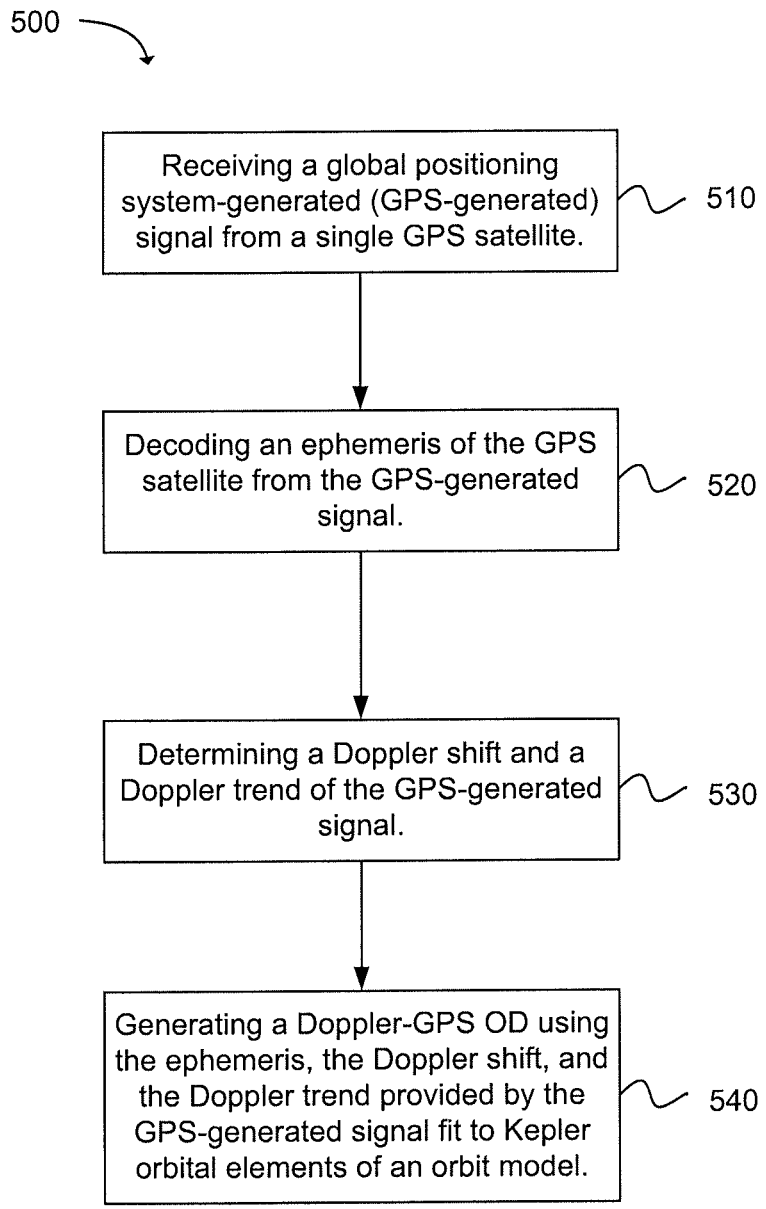
FIG. 7 depicts a flow chart of a method for orbital determination (OD) of a satellite in accordance with an example.

Another example provides a method 500 for orbital determination (OD) of a satellite, as shown in the flow chart in FIG. 7. The method may be executed as instructions on a machine, computer circuitry, or a processor or a transceiver for the orbital determination (OD) device, where the instructions are included on at least one computer readable medium or one non-transitory machine readable storage medium. The method includes the operation of receiving a global positioning system-generated (GPS-generated) signal from a single GPS satellite, as in block 510. The operation of decoding an ephemeris of the GPS satellite from the GPS-generated signal follows, as in block 520. The next operation of the method can be determining a Doppler shift and a Doppler trend of the GPS-generated signal, as in block 530. The method can further include generating a Doppler-GPS OD using the ephemeris, the Doppler shift, and the Doppler trend provided by the GPS-generated signal fit to Kepler orbital elements of an orbit model, as in block 540.

In an example, the operation of receiving the GPS-generated signal from the GPS satellite can further include receiving a first GPS-generated signal on a first GPS band from the GPS satellite, and receiving a second GPS-generated signal on a second GPS band from the GPS satellite. The operation of determining the Doppler shift and the Doppler trend of the GPS-generated signal can further include determining a Doppler shift of the first GPS-generated signal, and determining a Doppler shift of the second GPS-generated signal. The operation of generating the Doppler-GPS OD can further include compensating or correcting the Doppler shift and the Doppler trend for refraction and ionospheric shift by comparing the Doppler shift of the first GPS-generated signal and the Doppler shift of the second GPS-generated signal, and refining the Doppler-GPS OD using the compensated or corrected Doppler shift and Doppler trend.

In another example, the operation of receiving the GPS-generated signal from the GPS satellite can further include receiving a first GPS-generated signal on a first GPS band from the GPS satellite, and receiving a second GPS-generated signal on a second GPS band from the GPS satellite. The operation of determining the Doppler shift and the Doppler trend of the GPS-generated signal can further include differencing a Doppler shift of the first GPS-generated signal from a Doppler shift of the second GPS-generated signal, and Doppler trending the difference. The operation of generating the Doppler-GPS OD can further include fitting the Doppler trend to the Kepler orbital elements, wherein the Doppler-GPS OD can be generated without a precision local oscillator (LO).

Figure 8:
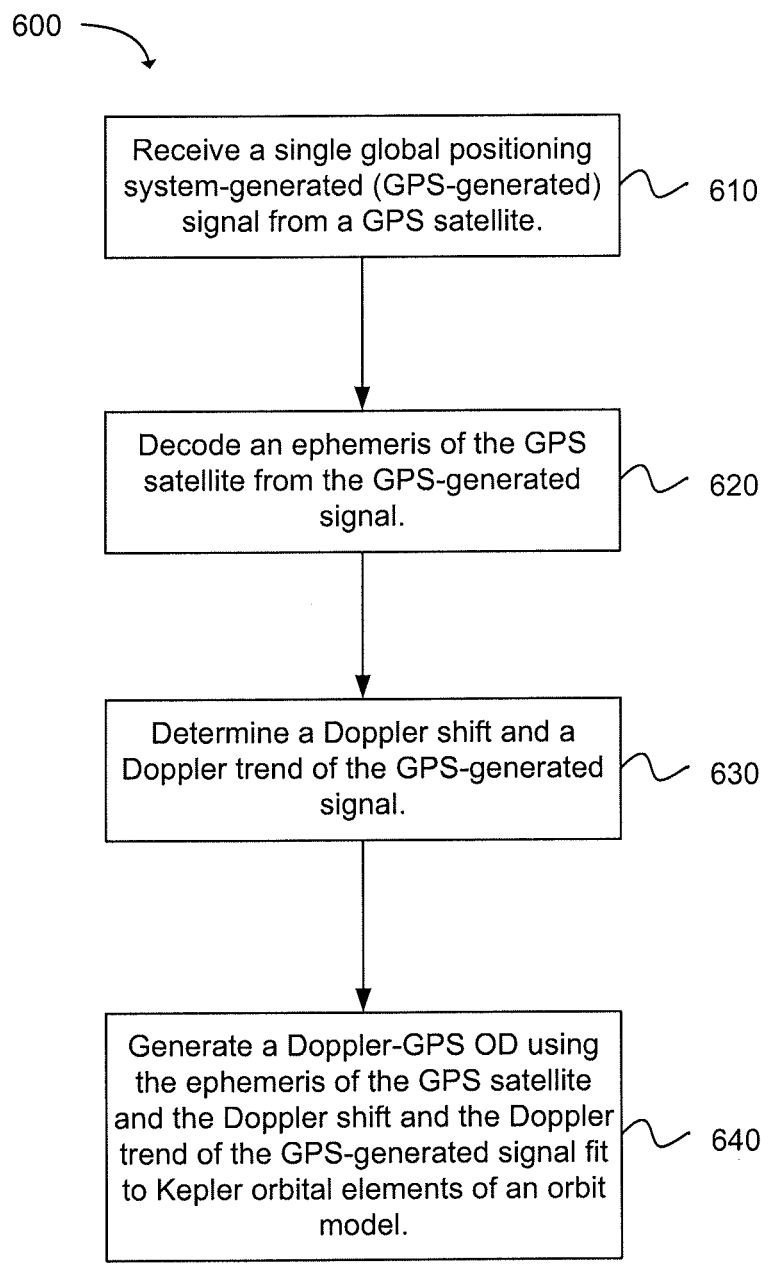
FIG. 8 depicts functionality of computer circuitry of an orbital determination (OD) device for a satellite operable to determine a satellite's orbit in accordance with an example.

Another example provides functionality 600 of computer circuitry of an orbital determination (OD) device for a satellite operable to determine a satellite's orbit, as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to receive a single global positioning system-generated (GPS-generated) signal from a GPS satellite, as in block 610. The computer circuitry can be further configured to decode an ephemeris of the GPS satellite from the GPS-generated signal, as in block 620. The computer circuitry can also be configured to determine a Doppler shift and a Doppler trend of the GPS-generated signal, as in block 630. The computer circuitry can further configured to generate a Doppler-GPS OD using the ephemeris of the GPS satellite and the Doppler shift and the Doppler trend of the GPS-generated signal fit to Kepler orbital elements of an orbit model, as in block 640.

In an example, the computer circuitry configured to receive the GPS-generated signal from the GPS satellite can be further configured to receive a first GPS-generated signal on a first GPS band (e.g., L1, L2, or L5) from the GPS satellite, and receive a second GPS-generated signal on a second GPS band from the GPS satellite. The computer circuitry configured to determine the Doppler shift and the Doppler trend of the GPS-generated signal can be further configured to determine a Doppler shift of the first GPS-generated signal, and determine a Doppler shift of the second GPS-generated signal. The computer circuitry can be further configured to compensate or correct the Doppler shift and the Doppler trend for refraction and ionospheric shift by comparing the Doppler shift of the first GPS-generated signal and the Doppler shift of the second GPS-generated signal. The computer circuitry configured to generate the Doppler-GPS OD can be further configured to refine the Doppler-GPS OD using the compensated or corrected Doppler shift and Doppler trend.

In another example, the computer circuitry can be further configured to determine a pseudorange from the GPS-generated signal. The computer circuitry configured to generate the Doppler-GPS OD can be further configured to refine the Doppler-GPS OD using the pseudorange.

In another configuration, the computer circuitry can be further configured to receive at least one GPS-generated signal from a second GPS satellite, decode an ephemeris of the second GPS satellite from the at least one GPS-generated signal, and determine a Doppler shift and a Doppler trend of the at least one GPS-generated signal. The computer circuitry configured to generate the Doppler-GPS OD can be further configured to refine the Doppler-GPS OD using the ephemeris, the Doppler shift, and the Doppler trend provided by the at least one GPS-generated signal.

In another example, the computer circuitry configured to receive the GPS-generated signal from the GPS satellite can be further configured to receive a first GPS-generated signal on a first GPS band (e.g., L1, L2, or L5) from the GPS satellite, and receive a second GPS-generated signal on a second GPS band from the GPS satellite. The computer circuitry configured to determine the Doppler shift and the Doppler trend of the GPS-generated signal can be further configured to difference a Doppler shift of the first GPS-generated signal from a Doppler shift of the second GPS-generated signal, and Doppler trend the difference. The computer circuitry configured to generate the Doppler-GPS OD can be further configured to fit the Doppler trend to the Kepler orbital elements and generate the Doppler-GPS OD without a precision local oscillator (LO).

In another configuration, the computer circuitry configured to receive the GPS-generated signal from the GPS satellite can be further configured to receive a first GPS-generated signal on a first GPS band (e.g., L1, L2, or L5) from the GPS satellite, receive a second GPS-generated signal on a second GPS band from the GPS satellite, and receive a third GPS-generated signal on a third GPS band from the GPS satellite. The computer circuitry configured to determine the Doppler shift and the Doppler trend of the GPS-generated signal can be further configured to difference a Doppler shift of two different pairs of the GPS-generated signals, double differencing the two different Doppler shift differences, and Doppler trend the double differences to generate a corrected relative Doppler trend. Each different pair can use a Doppler shift of the first, second, or third GPS-generated signal not in the other difference. The computer circuitry configured to generate the Doppler-GPS OD can be further configured to fit the corrected relative Doppler trend to the Kepler orbital elements. Each GPS band can include an L1, L2, or L5 band.

In another example, the computer circuitry can be further configured to receive a GPS-generated signal on a first GPS band from each of at least four GPS satellites, decode an ephemeris of each of the at least four GPS satellites from the respective GPS-generated signals, generate a GPS OD with GPS pseudorange data from the at least four GPS-generated signals, compare the Doppler-GPS OD with the GPS OD to a specified tolerance, and use the Doppler-GPS OD when the GPS OD differs from the Doppler-GPS OD beyond the specified tolerance. In another configuration, the computer circuitry can be further configured to check for simulated signals when the GPS OD differs from the Doppler-GPS OD beyond the specified tolerance and estimate a position of a spoofing device using the Doppler-GPS OD when the simulated signals are not used.

In another example, the Kepler orbital elements can include an ascending node (AN), an argument of perigee ($\omega$), an eccentricity (e), an inclination (I), a mean anomaly, or a semi-major axis.

Referring back to FIG. 2, the example orbital determination (OD) device or a receiver-on-board (ROB) 220 for OD of the satellite (e.g., LEO satellite 130, or GEO or HEO satellite 150) can be configured to receive a global positioning system-generated (GPS-generated) signal from a GPS satellite 140 via an antenna 210. The GPS-generated signal can use a L1 (144), L2 (146), or L5 (148) band, or any other GPS band used to transmit a pseudo-random noise code (PRN or PN code) signal available for commercial of military use (e.g., commercial coarse-acquisition (C/A)-type code, a military P(Y)-type code, or an M-type code using a varied GPS signal structure). The OD device or ROB can include a transceiver 230 and a processor 240. The OD device or ROB can be configured for OD of the satellite, as described in 500 of FIG. 7 or 600 of FIG. 8.

Referring back to FIG. 3, the example orbital determination (OD) device or a receiver-on-board (ROB) 220 for OD of the satellite (e.g., LEO satellite 130, or GEO or HEO satellite 150) can be configured to receive a global positioning system-generated (GPS-generated) signal 142A-D from a plurality of GPS satellites 140A-D via an antenna 210. Each GPS-generated signal 142A-D can use a L1, L2, or L5 band, or any other GPS band used to transmit a pseudo-random noise code (PRN or PN code) signal available for commercial of military use (e.g., commercial coarse-acquisition (C/A)-type code, a military P(Y)-type code, or an M-type code using a varied GPS signal structure).

In an example, the OD device or ROB 220 can include a transceiver 230 and a processor 240. The transceiver can be configured for receiving a global positioning system-generated (GPS-generated) signal on a first GPS band from each of at least four GPS satellites. The processor can be configured for decoding an ephemeris of each of the at least four GPS satellites from the GPS-generated signals; generating a GPS OD with GPS pseudorange data from the from the at least four GPS-generated signals; calculating a Doppler shift and a Doppler trend of at least one GPS-generated signal; generating a Doppler-GPS OD using the ephemeris, the Doppler shift, and the Doppler trend provided by the at least one GPS-generated signal fit to Kepler orbital elements of an orbit model; and comparing the GPS OD with the Doppler-GPS OD.

In another example, the processor can be further configured for checking for simulated signals when the GPS OD differs from the Doppler-GPS OD beyond a specified tolerance; and estimating a position of a spoofing device using the Doppler-GPS OD when simulated signals are not used. In another configuration, the processor can be further configured for generating a Doppler-GPS OD for each GPS-generated signal using the ephemeris, the Doppler shift, and the Doppler trend provided by each GPS-generated signal fit to Kepler orbital elements of an orbit model; and comparing each Doppler-GPS OD with other Doppler-GPS ODs to determine an erroneous GPS-generated signal.

In another example, the transceiver can be further configured for receiving a GPS-generated signal on each of at least two GPS bands from at least one of the at least four GPS satellites. The processor is further configured for calculating a Doppler shift and a Doppler trend of at least two GPS-generated signals on two different GPS bands; compensating or correcting the Doppler shift and the Doppler trend for refraction and ionospheric shift by comparing the Doppler shift of the two GPS-generated signals, and refining the Doppler-GPS OD using the compensated or corrected Doppler shift and Doppler trend.

In another configuration, the transceiver is further configured for receiving a GPS-generated signal on each of at least two GPS bands from at least one of the at least four GPS satellites. The processor can be further configured for differencing a Doppler shift of at least two GPS-generated signals on two different GPS bands; Doppler trending the difference; and fitting the Doppler trend of the difference to the Kepler orbital elements, wherein the Doppler-GPS OD is generated without a precision local oscillator (LO). The satellite can include a CUBESAT, a picosatellite, a nanosatellite, a microsatellite, a low Earth orbit (LEO) satellite, a geostationary Earth orbit (GEO), or a high Earth orbit (HEO) satellite. The CUBESAT can weigh less than 5 kilograms.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An orbital determination (OD) device for a satellite operable to determine a satellite's orbit, the OD device having computer circuitry configured to:
   receive a single global positioning system-generated (GPS-generated) signal from a GPS satellite;
   decode an ephemeris of the GPS satellite from the GPS-generated signal;
   determine a Doppler shift and a trend of Doppler shift of the GPS-generated signal; and
   generate a Doppler-GPS OD using the ephemeris of the GPS satellite and the Doppler shift and the trend of Doppler shift of the GPS-generated signal fit to Kepler orbital elements of an orbit model.

2. The computer circuitry of claim 1, wherein:
   the computer circuitry configured to receive the GPS-generated signal from the GPS satellite is further configured to receive a first GPS-generated signal on a first GPS band from the GPS satellite, and receive a second GPS-generated signal on a second GPS band from the GPS satellite;

the computer circuitry configured to determine the Doppler shift and the trend of Doppler shift of the GPS-generated signal is further configured to determine a Doppler shift of the first GPS-generated signal, and determine a Doppler shift of the second GPS-generated signal;

the computer circuitry is further configured to compensate or correct the Doppler shift and the trend of Doppler shift for refraction and ionospheric shift by comparing the Doppler shift of the first GPS-generated signal and the Doppler shift of the second GPS-generated signal; and the computer circuitry configured to generate the Doppler-GPS OD is further configured to refine the Doppler-GPS OD using the compensated or corrected Doppler shift and trend of Doppler shift.

3. The computer circuitry of claim 1, further configured to:
determine a pseudorange from the from the GPS-generated signal, wherein
the computer circuitry configured to generate the Doppler-GPS OD is further configured to refine the Doppler-GPS OD using the pseudorange.

4. The computer circuitry of claim 1, further configured to:
receive at least one GPS-generated signal from a second GPS satellite;
decode an ephemeris of the second GPS satellite from the at least one GPS-generated signal; and
determine a Doppler shift and a trend of Doppler shift of the at least one GPS-generated signal,
wherein the computer circuitry configured to generate the Doppler-GPS OD is further configured to refine the Doppler-GPS OD using the ephemeris, the Doppler shift, and the trend of Doppler shift provided by the at least one GPS-generated signal.

5. The computer circuitry of claim 1, wherein:
the computer circuitry configured to receive the GPS-generated signal from the GPS satellite is further configured to:
receive a first GPS-generated signal on a first GPS band from the GPS satellite, and
receive a second GPS-generated signal on a second GPS band from the GPS satellite;
the computer circuitry configured to determine the Doppler shift and the trend of Doppler shift of the GPS-generated signal is further configured to:
difference a Doppler shift of the first GPS-generated signal from a Doppler shift of the second GPS-generated signal, and
trending the difference of the Doppler shift of the first and second GPS-generated signals; and
the computer circuitry configured to generate the Doppler-GPS OD is further configured to:
fit the trend of Doppler shift to the Kepler orbital elements and generate the Doppler-GPS OD without a precision local oscillator (LO).

6. The computer circuitry of claim 1, wherein:
the computer circuitry configured to receive the GPS-generated signal from the GPS satellite is further configured to:
receive a first GPS-generated signal on a first GPS band from the GPS satellite,
receive a second GPS-generated signal on a second GPS band from the GPS satellite, and
receive a third GPS-generated signal on a third GPS band from the GPS satellite;
the computer circuitry configured to determine the Doppler shift and the trend of Doppler shift of the GPS-generated signal is further configured to:
difference a Doppler shift of two different pairs of the GPS-generated signals, wherein each different pair uses a Doppler shift of the first, second, or third GPS-generated signal not in the other difference,
double differencing the two different Doppler shift differences, and
trend the double differences to generate a corrected relative trend of Doppler shift; and
the computer circuitry configured to generate the Doppler-GPS OD is further configured to:
fit the corrected relative trend of Doppler shift to the Kepler orbital elements.

7. The computer circuitry of claim 6, wherein each GPS band includes an L1, L2, or L5 band.

8. The computer circuitry of claim 1, further configured to:
receive a GPS-generated signal on a first GPS band from each of at least four GPS satellites;
decode an ephemeris of each of the at least four GPS satellites from the respective GPS-generated signals;
generate a GPS OD with GPS pseudorange data from the at least four GPS-generated signals;
compare the Doppler-GPS OD with the GPS OD to a specified tolerance; and
use the Doppler-GPS OD when the GPS OD differs from the Doppler-GPS OD beyond the specified tolerance.

9. The computer circuitry of claim 8, further configured to:
check for simulated signals when the GPS OD differs from the Doppler-GPS OD beyond the specified tolerance; and
estimate a position of a spoofing device using the Doppler-GPS OD when the simulated signals are not used.

10. The computer circuitry of claim 1, wherein the Kepler orbital elements are selected from the group consisting of an ascending node (AN), an argument of perigee ($\omega$), an eccentricity (e), an inclination (I), a mean anomaly, and a semi-major axis.

11. A method for orbital determination (OD) of a satellite, comprising:
receiving a global positioning system-generated (GPS-generated) signal from a single GPS satellite;
decoding an ephemeris of the GPS satellite from the GPS-generated signal;
determining a Doppler shift and a trend of Doppler shift of the GPS-generated signal; and
generating a Doppler-GPS OD using the ephemeris, the Doppler shift, and the trend of Doppler shift provided by the GPS-generated signal fit to Kepler orbital elements of an orbit model.

12. The method of claim 11, wherein:
receiving the GPS-generated signal from the GPS satellite further comprises:
receiving a first GPS-generated signal on a first GPS band from the GPS satellite, and
receiving a second GPS-generated signal on a second GPS band from the GPS satellite;
determining the Doppler shift and the trend of Doppler shift of the GPS-generated signal further comprises:

determining a Doppler shift of the first GPS-generated signal, and determining a Doppler shift of the second GPS-generated signal; and generating the Doppler-GPS OD further comprises:

compensating or correcting the Doppler shift and the trend of Doppler shift for refraction and ionospheric shift by comparing the Doppler shift of the first GPS-generated signal and the Doppler shift of the second GPS-generated signal, and refining the Doppler-GPS OD using the compensated or corrected Doppler shift and trend of Doppler shift.

13. The method of claim 11, wherein:

receiving the GPS-generated signal from the GPS satellite further comprises:

receiving a first GPS-generated signal on a first GPS band from the GPS satellite, and receiving a second GPS-generated signal on a second GPS band from the GPS satellite;

determining the Doppler shift and the trend of Doppler shift of the GPS-generated signal further comprises:

differencing a Doppler shift of the first GPS-generated signal from a Doppler shift of the second GPS-generated signal, and trending the difference of the Doppler shift of the first and second GPS-generated signals; and generating the Doppler-GPS OD further comprises:

fitting the trend of Doppler shift to the Kepler orbital elements, wherein the Doppler-GPS OD can be generated without a precision local oscillator (LO).

14. At least one non-transitory machine readable storage medium comprising a plurality of instructions adapted to be executed to implement the method of claim 11.

15. A receiver-on-board (ROB) for a satellite for orbital determination (OD) of the satellite, the ROB comprising:

a transceiver for receiving a global positioning system-generated (GPS-generated) signal on a first GPS band from each of at least four GPS satellites; and a processor for:

decoding an ephemeris of each of the at least four GPS satellites from the GPS-generated signals, generating a GPS OD with GPS pseudorange data from the from the at least four GPS-generated signals, calculating a Doppler shift and a trend of Doppler shift trend of at least one GPS-generated signal, generating a Doppler-GPS OD using the ephemeris, the Doppler shift, and the trend of Doppler shift provided by the at least one GPS-generated signal fit to Kepler orbital elements of an orbit model, and comparing the GPS OD with the Doppler-GPS OD.

16. The ROB of claim 15, wherein the processor is further configured for:

checking for simulated signals when the GPS OD differs from the Doppler-GPS OD beyond a specified tolerance; and estimating a position of a spoofing device using the Doppler-GPS OD when simulated signals are not used.

17. The ROB of claim 15, wherein the processor is further configured for:

generating a Doppler-GPS OD for each GPS-generated signal using the ephemeris, the Doppler shift, and the trend of Doppler shift by each GPS-generated signal fit to Kepler orbital elements of an orbit model; and comparing each Doppler-GPS OD with other Doppler-GPS ODs to determine an erroneous GPS-generated signal.

18. The ROB of claim 15, wherein:

the transceiver is further configured for:

receiving a GPS-generated signal on each of at least two GPS bands from at least one of the at least four GPS satellites; and the processor is further configured for:

calculating a Doppler shift and a trend of Doppler shift of at least two GPS-generated signals on two different GPS bands, compensating or correcting the Doppler shift and the trend of Doppler shift for refraction and ionospheric shift by comparing the Doppler shift of the two GPS-generated signals, and refining the Doppler-GPS OD using the compensated or corrected Doppler shift and trend of Doppler shift.

19. The ROB of claim 15, wherein:

the transceiver is further configured for:

receiving a GPS-generated signal on each of at least two GPS bands from at least one of the at least four GPS satellites; and the processor is further configured for:

differencing a Doppler shift of at least two GPS-generated signals on two different GPS bands, trending the difference in the Doppler shift of the at least two GPS-generated signals on two different GPS bands, and fitting the trend of Doppler shift of the difference to the Kepler orbital elements, wherein the Doppler-GPS OD is generated without a precision local oscillator (LO).

20. The ROB of claim 15, wherein the satellite is selected from the group consisting of a CUBESAT, a picosatellite, a nanosatellite, a microsatellite, a low Earth orbit (LEO) satellite, a geostationary Earth orbit (GEO), and a high Earth orbit (HEO) satellite, wherein the CUBESAT weighs less than 5 kilograms.

* * * * *